(12) United States Patent
Abe et al.

(10) Patent No.: US 7,293,800 B2
(45) Date of Patent: Nov. 13, 2007

(54) KNEE PROTECTOR FOR VEHICLE

(75) Inventors: Masato Abe, Tokyo (JP); You Matsutani, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 11/643,931

(22) Filed: Dec. 22, 2006

(65) Prior Publication Data
US 2007/0164548 A1 Jul. 19, 2007

(30) Foreign Application Priority Data
Dec. 28, 2005 (JP) .............................. 2005-379849

(51) Int. Cl.
*B60R 21/045* (2006.01)
(52) U.S. Cl. ..................................... 280/751
(58) Field of Classification Search ................ 280/751, 280/752; 296/189, 190.01, 35.2, 70; 297/488; 188/371
See application file for complete search history.

(56) References Cited

U.S. PATENT DOCUMENTS

| | | | |
|---|---|---|---|
| 3,834,482 A * | 9/1974 | Wada et al. ................... | 180/90 |
| 3,930,665 A * | 1/1976 | Ikawa ......................... | 280/751 |
| 3,966,227 A * | 6/1976 | Cameron ..................... | 280/752 |
| 5,370,417 A * | 12/1994 | Kelman et al. ............. | 280/751 |
| 5,577,770 A * | 11/1996 | Sinner et al. ............... | 280/752 |
| 6,170,872 B1 * | 1/2001 | Bair et al. .................. | 280/751 |
| 6,702,324 B2 * | 3/2004 | Shimoyamada et al. .... | 280/752 |
| 6,837,518 B2 * | 1/2005 | Mullan ....................... | 280/752 |
| 6,869,123 B2 * | 3/2005 | Marks et al. ................. | 296/70 |
| 7,210,704 B2 * | 5/2007 | Ko ............................. | 280/748 |
| 2004/0056463 A1 * | 3/2004 | Marks et al. ............... | 280/752 |
| 2005/0156421 A1 * | 7/2005 | Nykiel et al. ............... | 280/752 |

FOREIGN PATENT DOCUMENTS

JP 8-192702 A 7/1996

* cited by examiner

*Primary Examiner*—Faye M. Fleming
(74) *Attorney, Agent, or Firm*—Foley & Lardner LLP

(57) ABSTRACT

A knee protector for a vehicle, which includes: a lower bracket including a base part in which an upper end thereof is fixed to a steering member of the vehicle, and a lower deformation part flexed upwardly from a lower end of the base part; an upper bracket including a front end part fixed to the base part of the lower bracket or fixed to the steering member, and an upper deformation part flexed downwardly from the front end part and located in a position higher than a position of the lower deformation part; a first foamed body provided between the lower deformation part and the base part; and a second foamed body provided between the upper deformation part and the base part.

16 Claims, 9 Drawing Sheets

KNEE PROTECTOR FOR VEHICLE

BACKGROUND

The present invention relates to a knee protector for a vehicle, for protecting knees of an occupant.

Inside of an instrument panel in an interior of a vehicle such as an automobile for example is provided with pairs of right and left knee protectors at positions corresponding to a driver seat and a passenger seat.

Each of the knee protectors, such as a knee protector disclosed in Japanese patent publication No. H08-192702, has an approximately V-shaped or a U-shaped structure having a deformation part flexed upwardly from a lower end of a base part in which an upper end thereof is fixed to a steering member. The knee protector also has a U-like or a hat-shaped cross-section having flange parts bent orthogonally from side ends, respectively. When the vehicle collides, each knee of an occupant hits against the deformation part of the knee protector via the instrument panel, and each of the deformation parts is deformed in a direction to which the deformation parts are folded. Thereby, impact energy of the knees of the occupant is absorbed, and the occupant's knees are protected.

However, in the knee protector including the knee protector disclosed in Japanese patent publication No. H08-192702 for example, the deformation part having the U-like or the hat-shaped cross-section of the knee protector is deformed in the direction to which the deformation part is folded to absorb the impact energy of the knees of the occupant, and therefore, there is a problem that absorption efficiency of the impact energy is low. Also, since reaction force fluctuates when the flange parts, each bent orthogonally from the side ends, are bent, shape design of the knee protector is difficult. Moreover, because each knee of various occupants having different height due to a difference in physical constitution of the occupants is received with one deformation part of the knee protector, the most appropriate absorption of the impact energy in accordance with the difference in the physical constitution of the occupants cannot be accomplished.

SUMMARY

At least one objective of the present invention is to provide a knee protector for a vehicle having high absorption efficiency of impact energy.

To achieve these and other advantages and in accordance with the purpose of the invention, as embodied and broadly described herein, the invention provides a knee protector for a vehicle, which comprises: a lower bracket including a base part in which an upper end thereof is fixed to a steering member of the vehicle, and a lower deformation part flexed upwardly from a lower end of the base part; an upper bracket including a front end part fixed to the base part of the lower bracket, and an upper deformation part flexed downwardly from the front end part and located in a position higher than a position of the lower deformation part; a first foamed body provided between the lower deformation part and the base part; and a second foamed body provided between the upper deformation part and the base part.

In addition, to achieve these and other advantages and in accordance with the purpose of the invention, as embodied and broadly described herein, the invention provides a knee protector for a vehicle, which comprises: a lower bracket including a base part in which an upper end thereof is fixed to a steering member of the vehicle, and a lower deformation part flexed upwardly from a lower end of the base part; an upper bracket including a front end part fixed to the steering member, and an upper deformation part flexed downwardly from the front end part and located in a position higher than a position of the lower deformation part; a first foamed body provided between the lower deformation part and the base part; and a second foamed body provided between the upper deformation part and the base part.

Advantageously, the first foamed body has a first material property, and a second foamed body has a second material property different from the first material property of the first foamed body.

Advantageously, the first foamed body has a first allowable stress, and the second foamed body has a second allowable stress higher than the first allowable stress of the first foamed body.

Advantageously, one of the lower deformation part and the upper deformation part, or both of the lower deformation part and the upper deformation pant, has/have a substantially flat shape.

Advantageously, the lower deformation part comprises at least one through-hole, and a part of the first foamed body is provided integrally on a front surface of the lower deformation part through the at least one through-hole as a cover part.

Advantageously, the upper deformation part comprises at least one through-hole, and a part of the second foamed body is provided integrally on a front surface of the upper deformation part through the at least one through-hole as a cover part.

Advantageously, the first foamed body and the second foamed body are attached together by an adhesive.

Advantageously, a material used for the first foamed body and the second foamed body is selected from a group consisting of urethane, polystyrene, polyethylene, polypropylene, and a combination thereof.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
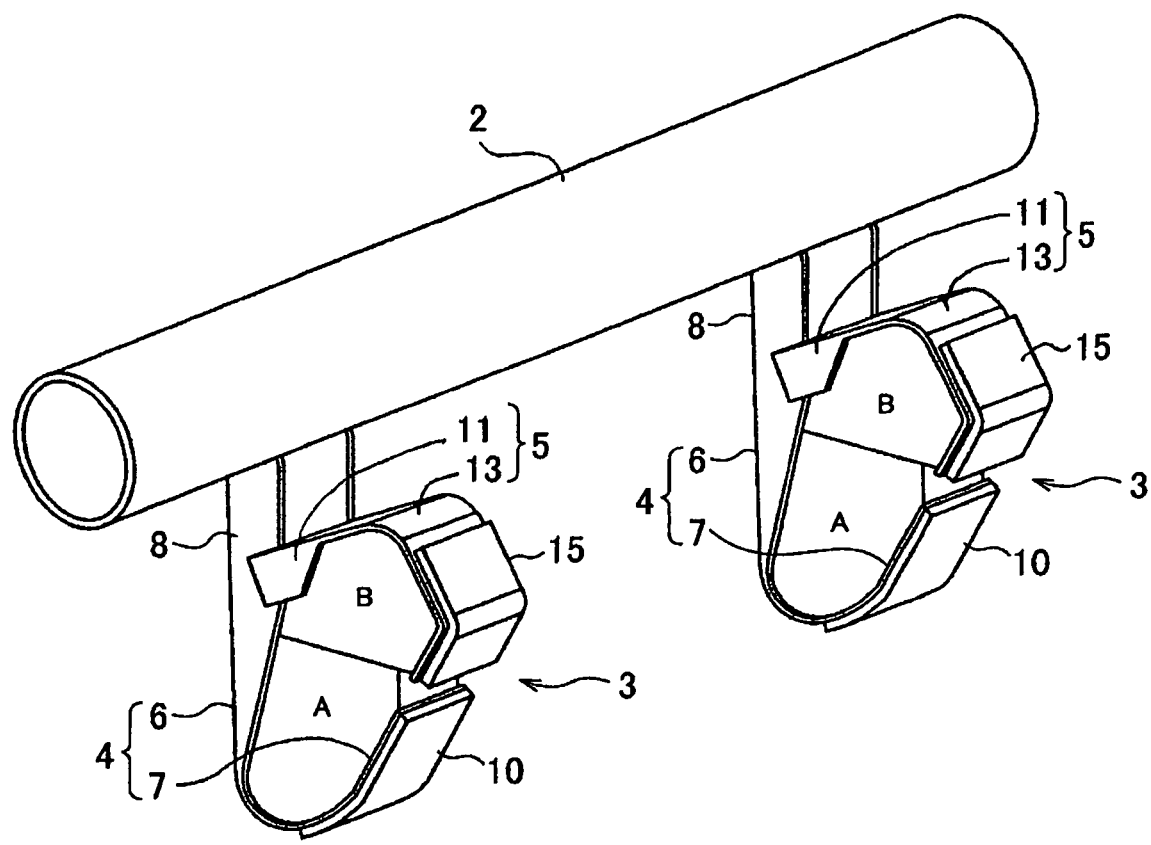
FIG. 1 is a perspective view illustrating knee protectors according to a first embodiment of the invention.
Figure 2:
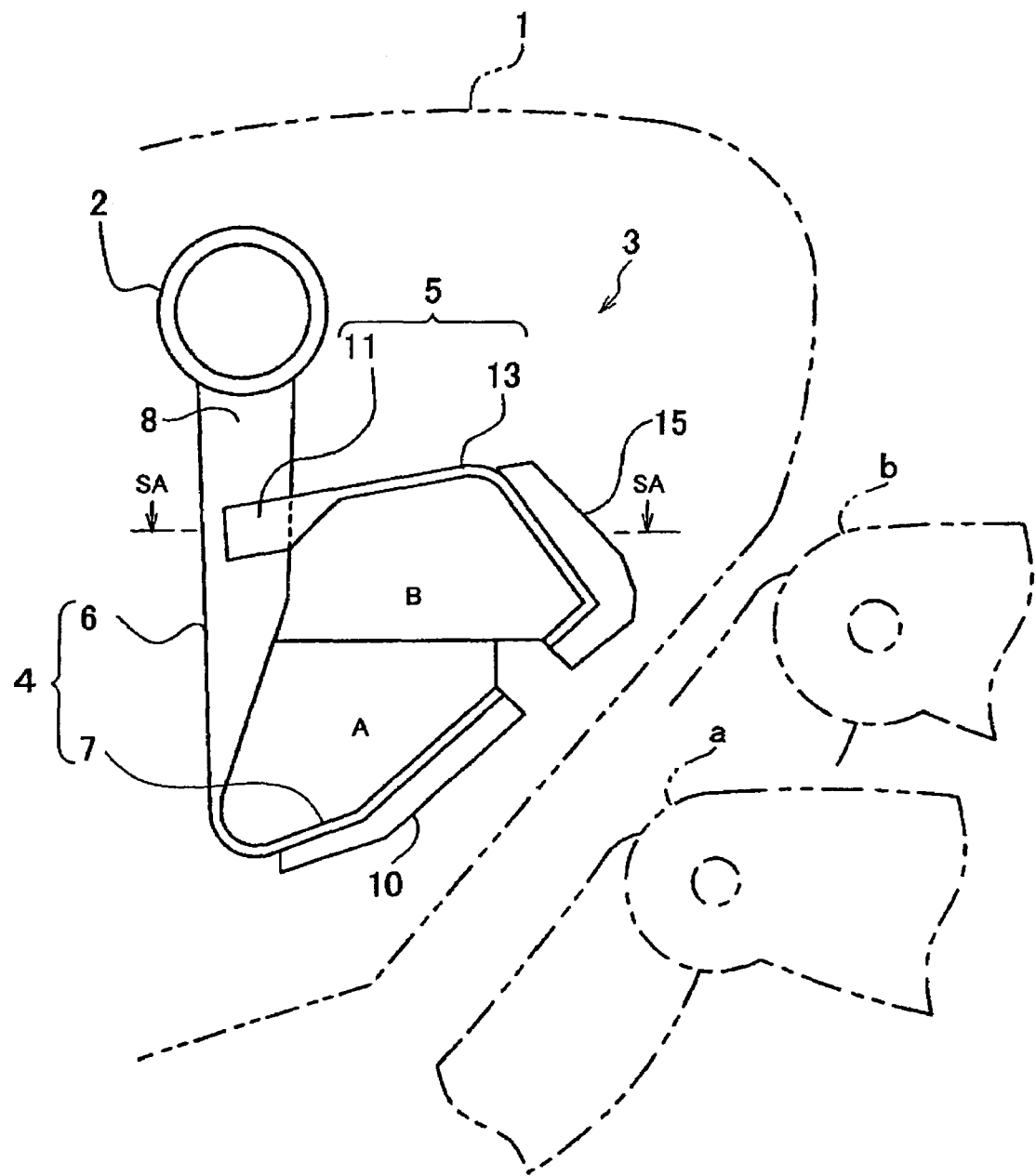
FIG. 2 is a side view illustrating the knee protector according to the first embodiment of the invention.
Figure 3:
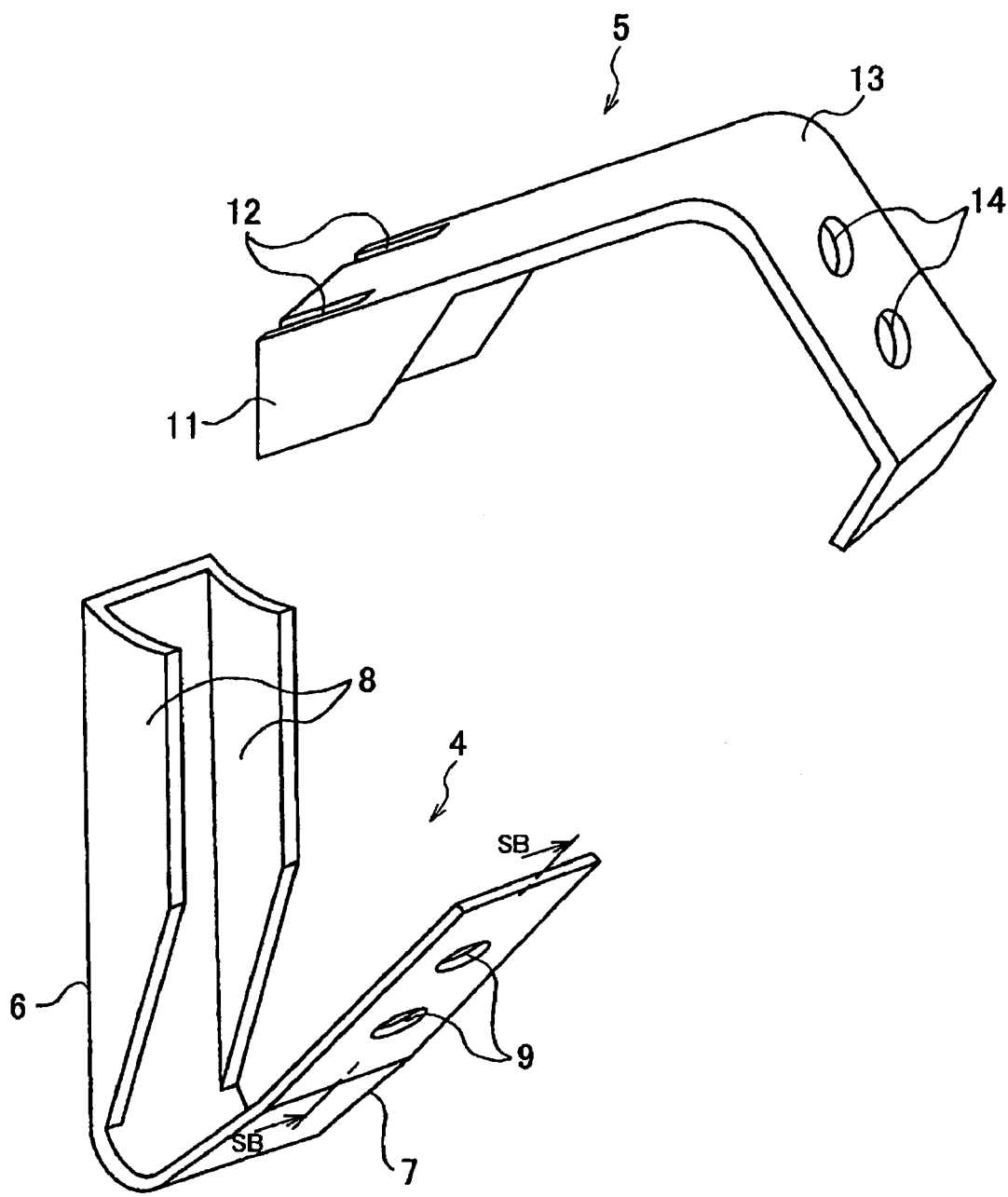
FIG. 3 is a perspective view illustrating a lower bracket and an upper bracket or the knee protector according to the first embodiment of the invention.
Figure 4:
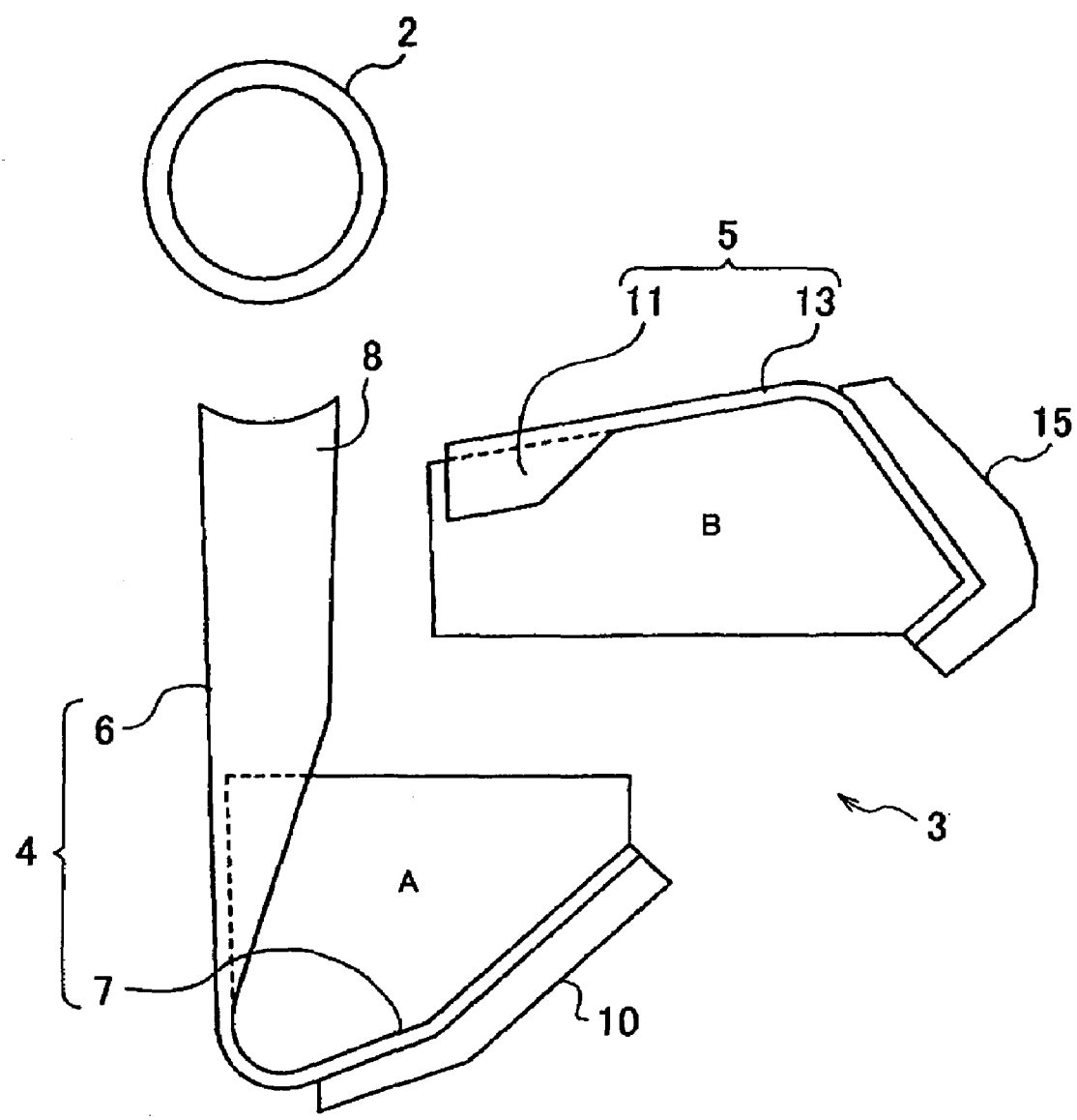
FIG. 4 is an exploded side view illustrating the knee protector according to the first embodiment of the invention.

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIGS. 1 to 10 each illustrate a first embodiment of the present invention.

Inside of an instrument panel 1 (see FIG. 2) arranged in a front part in an interior of a vehicle is disposed with a steering member 2 along a direction of width of the vehicle. On a driver seat side and a passenger seat side of the steering member 2, a pair of right and left knee protectors 3 is attached, respectively. Hence, in the present preferred embodiment, a total of four knee protectors 3 are mounted to the steering member 2. Here, the pair of knee protectors 3 may be attached to the driver seat side or the passenger seat side of the steering member 2 only, or may be provided for a back seat, as the occasion demands.

The knee protector 3 is structured by a lower bracket 4 fixed to the steering member 2, and an upper bracket 5 fixed to the lower bracket 4.

The lower bracket 4 includes a base part 6 and a lower deformation part 7. The base part 6 has a substantially U-shaped cross-section having flanges 8 bent orthogonally from side ends, respectively, and an upper end thereof is fixed to the steering member 2. The width of each of the flanges 8 of the base part 6 is preferably decreased gradually as the flanges 8 extend downwardly.

A lower end of the base part 6 is continuously provided with the lower deformation part 7 preferably in a plate-like shape and flexed upwardly from the lower end of the base part 6. In the present preferred embodiment, the lower deformation part 7 is provided with two through-holes 9.

As illustrated in FIG. 1, a foamed body or preferably a high-density foamed body A is provided between the lower deformation part 7 and the base part 6. In the present preferred embodiment, the high-density foamed body A is filled between the lower deformation part 7 and the base part 6 by an insert molding, and an upper surface of the high-density foamed body A is formed flat. A part of the high-density foamed body A may be provided integrally on a front surface side of the lower deformation part 7 through the through-holes 9 as a cover part 10.

A material used in the high-density foamed body A is urethane in the present preferred embodiment. However, any material generally used for a foamed body or equivalent to the urethane can be used for the high-density foamed body A. Preferably, a material used for the high-density foamed body A includes urethane, polystyrene, polyethylene, polypropylene, and a combination thereof.

The upper bracket 5 includes a front end part 11. In the present preferred embodiment, only the front end part 11 of the upper bracket 5 is in a substantially U-shaped cross-section, and provided with a pair of right and left slit-like cutouts 12. The front end part 11 is continuously provided with an upper deformation part 13 preferably in a plate-like shape and flexed downwardly from the front end part 11. The upper deformation part 13 may be also provided with two through-holes 14.

An inner surface side of the upper bracket 5 is provided with a foamed body or preferably a high-density foamed body B. The high-density foamed body B as urethane for example but not limited thereto may be filled inside of the upper bracket 5 by an insert molding. A lower surface of the high-density foamed body B is formed flat. A part of the high-density foamed body B may also be provided integrally on a front surface side of the upper deformation part 13 through the through-holes 14 as a cover part 15.

A material used in the high-density foamed body B is also urethane in the present preferred embodiment. However, any material generally used for a foamed body or equivalent to the urethane can be used for the high-density foamed body B. Preferably, a material used for the high-density foamed body B includes urethane, polystyrene, polyethylene, polypropylene, and a combination thereof.

The high-density foamed body B of the upper bracket 5 may be formed such that interspaces are slightly remained on left and right sides in a width direction of the upper bracket 5, i.e., the high-density foamed body B may be formed so as not to cover the entire width of the upper bracket 5. In addition, the high-density foamed body B may be formed to protrude slightly more forward than the front end part 11.

Now, one example of assembling of the knee protector 3 according to the present preferred embodiment of the invention will be described.

First, the cutouts 12 of the front end part 11 of the upper bracket 5 are inserted into the flanges 8 of the base part 6 of the lower bracket 4. The high-density foamed body B of the upper bracket 5 is placed on the high-density foamed body A of the lower bracket 4, and the high-density foamed bodies A and B are attached together preferably with an adhesive. The front end part 11 of the upper bracket 5 and the flanges 8 of the base part 6 in the lower bracket 4 may be coupled together by welding. Accordingly, the high-density foamed body B of the upper bracket 5 is held between the upper deformation part 13 and the base part 6.

Figure 5:
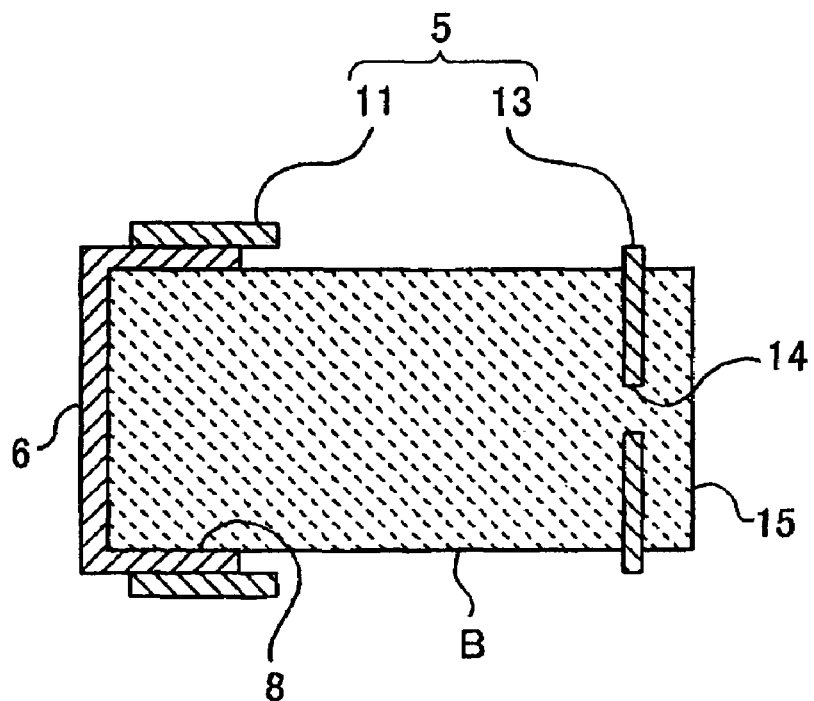
FIG. 5 is a cross-sectional view taken along a line SA-SA represented by arrows in FIG. 2.
Figure 6:
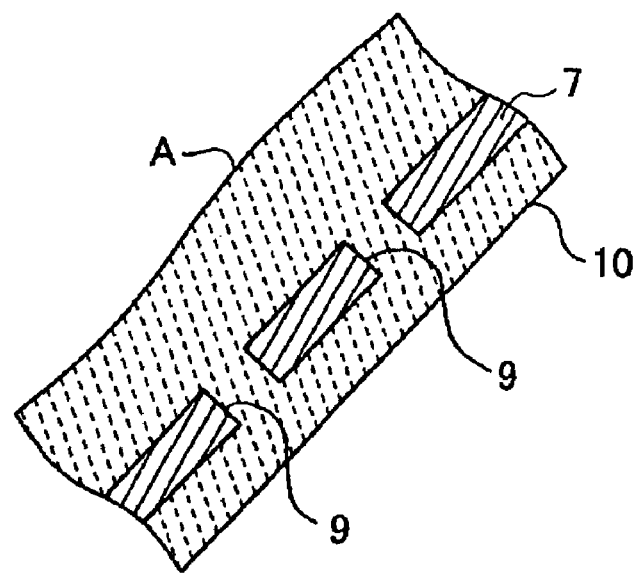
FIG. 6 is a cross-sectional view taken along a line SB-SB represented by arrows in FIG. 3.

The upper deformation part 13 of the upper bracket 5 is positioned higher than the lower deformation part 7 of the lower bracket 4 and as illustrated in FIG. 5, a front end portion of the high-density foamed body B of the upper bracket 5 is inserted between the flanges 8 of the base part 6. Hence, prevention of lateral misalignment of the high-density foamed body B in a case in which a load is obliquely applied to the upper bracket 5 is ensured.

Finally, the upper end of the lower bracket 4, to which the upper bracket 5 is attached, is fixed to the steering member 2 by welding for example, and thereby, the knee protector 3 is formed. The pair of right and left knee protectors 3 is attached to the steering member 2 in, for example, a driver seat and a passenger seat in accordance with width corresponding to knees "a" and "b" of an occupant.

In the knee protector 3, the upper deformation part 13 of the upper bracket 5 is located in a position higher than that of the lower deformation part 7 of the lower bracket 4. Hence, the upper bracket 5 corresponds to the knee "b" located at a high position of an occupant having a large physical constitution or a dummy "AM50" for example, whereas the lower bracket 4 located in a lower position corresponds to the knee "a" located at a lower position of an occupant having a small physical constitution or a dummy "AF05" for example.

Figure 7:
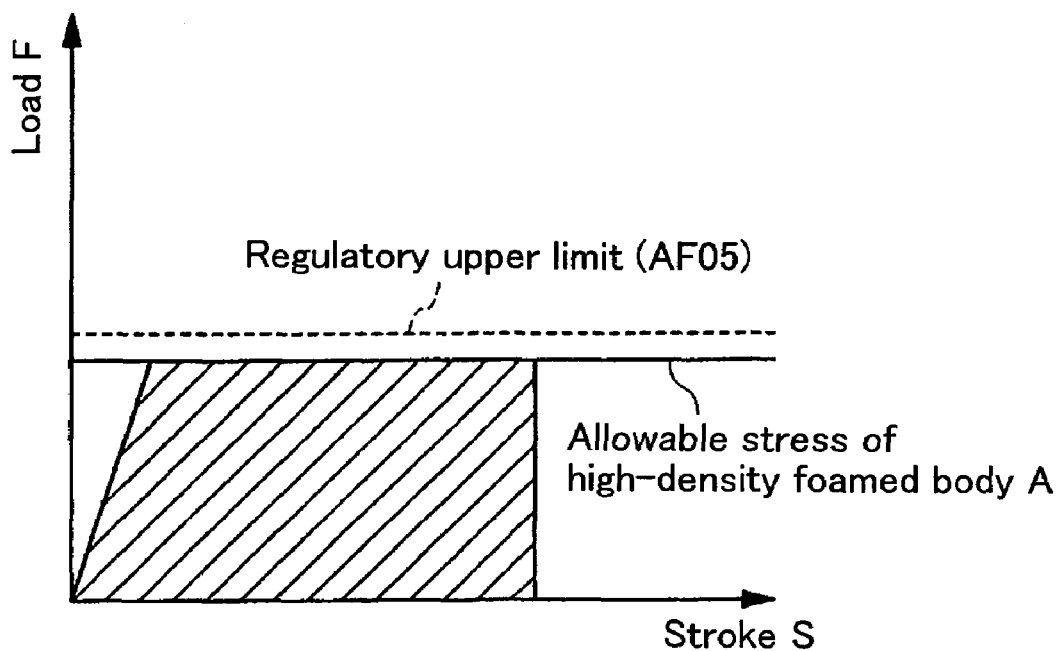
FIG. 7 is a graph representing allowable stress of a high-density foamed body of the lower bracket.
Figure 8:
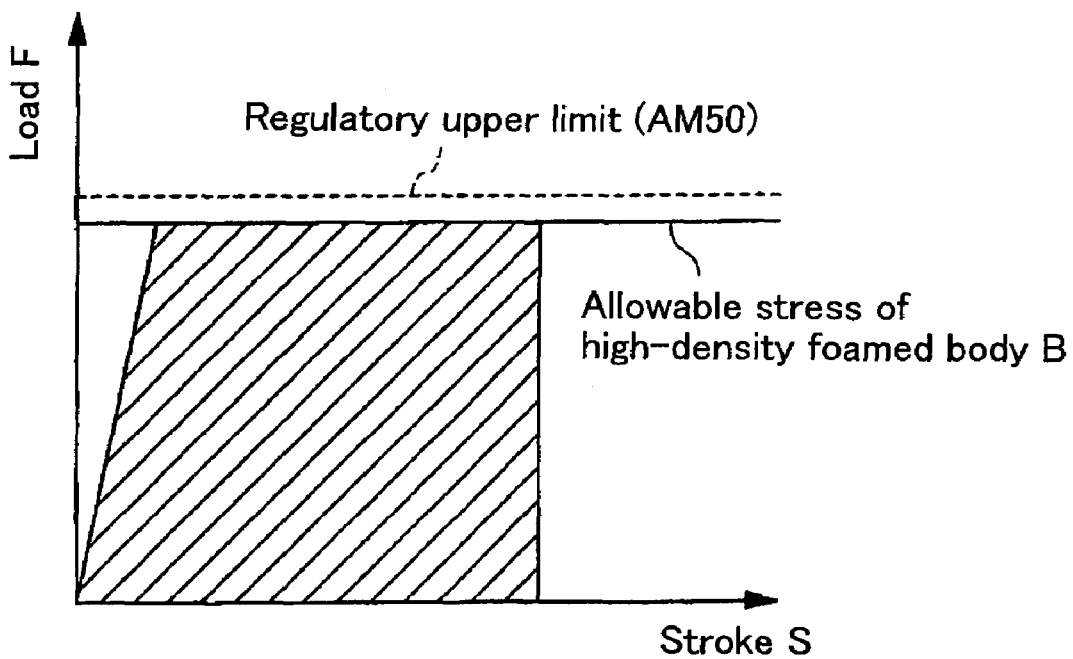
FIG. 8 is a graph representing allowable stress of a high-density foamed body of the upper bracket.

In the present preferred embodiment, accordingly, allowable stress of the high-density foamed body A of the lower bracket 4 and the high-density foamed body B of the upper bracket 5 is different from each other. As illustrated in FIGS. 7 and 8, for example, the allowable stress of the high-density foamed body B of the upper bracket 5 is set to be larger than the allowable stress of the high-density foamed body A of the lower bracket 4, while the allowable stresses of the high-density foamed bodies A and B are both maintained lower than regulatory upper limits, for example, of the AF05 and the AM 50, respectively.

Therefore, according to the present preferred embodiment of the invention, the allowable stresses or material properties of the upper and lower high-density foamed bodies A and B are adjusted, respectively. Hence, the most appropriate impact energy absorption corresponding to the knees "a" and "b" having different heights due to difference in physical constitution of various occupants is possible. In addition, since reaction force of the high-density foamed bodies A and B is substantially constant, it is possible to form the shape of the lower deformation part 7 of the lower bracket 4 and the upper deformation part 13 of the upper bracket 5 to be flat. Thus, shape design of the lower bracket 4 and the upper bracket 5 is easy.

Now, a mode of deformation of the knee protector 3 in collision of a vehicle will be described.

Figure 9:
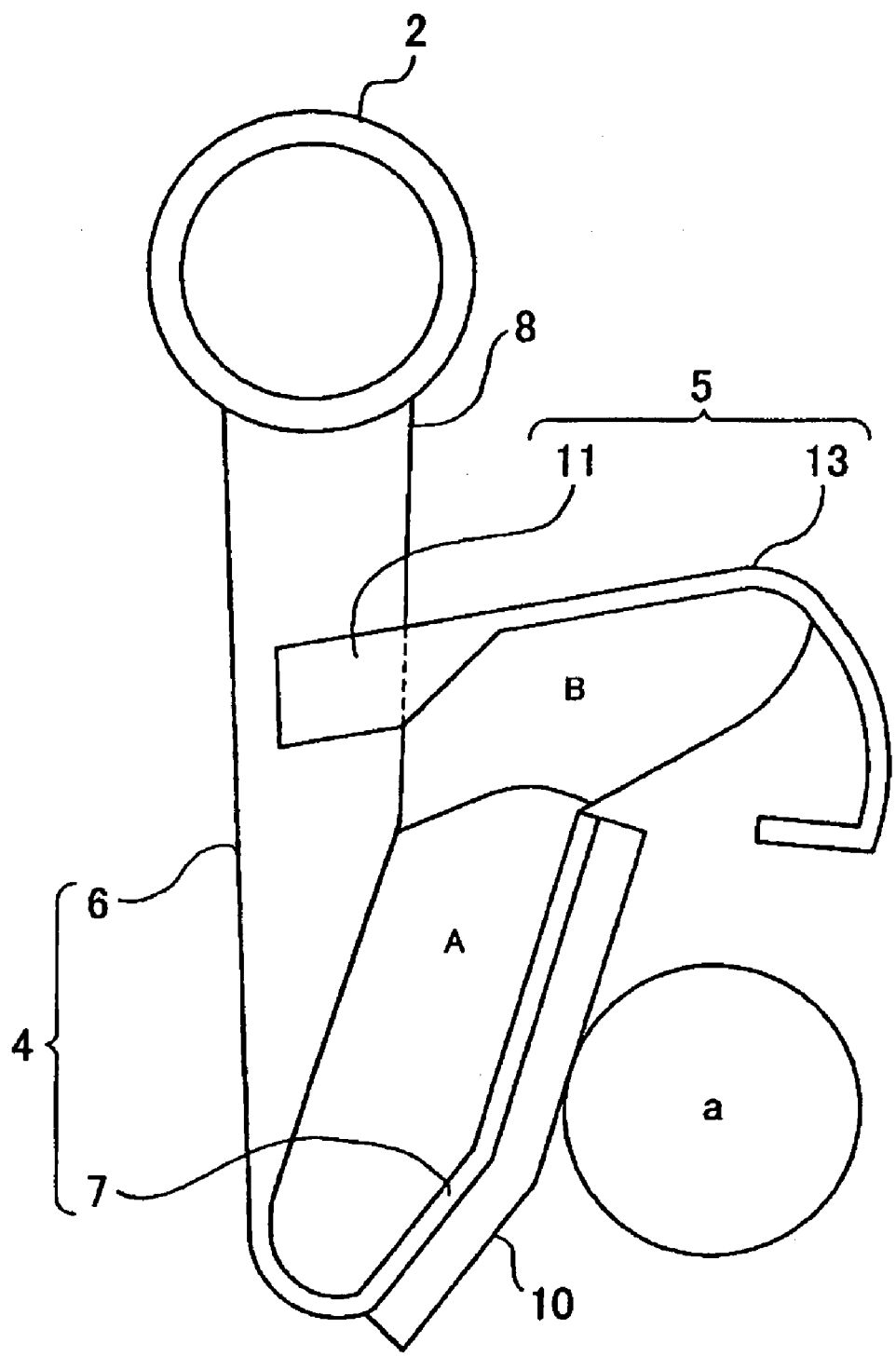
FIG. 9 is a side view illustrating a state in which a knee of small height is hit against the lower bracket.

Referring to FIG. 9, for example, when the knee "a" located in the lower position of the occupant having the small physical constitution enters into the knee protector 3, the knee "a" hits against the lower deformation part 7 of the lower bracket 4 through the instrument panel 1. The lower deformation part 7 against which the knee "a" is hit deforms in such a manner as to be bent forward while crushing the high-density foamed body A, so as to absorb the impact energy.

Because the lower bracket 4 deforms as the high-density foamed body A adjusted to be in the optimum allowable stress is squashed, absorption efficiency of the impact energy is high, and thus the sufficient impact energy absorption is possible even with a short stroke of entering of the knee "a" into the knee protector 3. Accordingly, it is possible to make longitudinal dimensions of the knee protector 3 small, and a position of a rear surface part of the instrument panel is also possible to be set forwardly. Hence, it is possible to attain enlargement of a space of the vehicle interior.

In addition, since the upper and lower high-density foamed bodies A and B are attached mutually with the adhesive for example, the high-density foamed body B on the upper side also deforms when the lower deformation part 7 is deformed, contributing to the impact energy absorption. Moreover, since the cover part 10 is integrally formed on the surface side of the lower deformation part 7, the cover part 10 is also crushed between the lower deformation part 7 and the instrument panel 1 to further absorb the impact energy.

Figure 10:
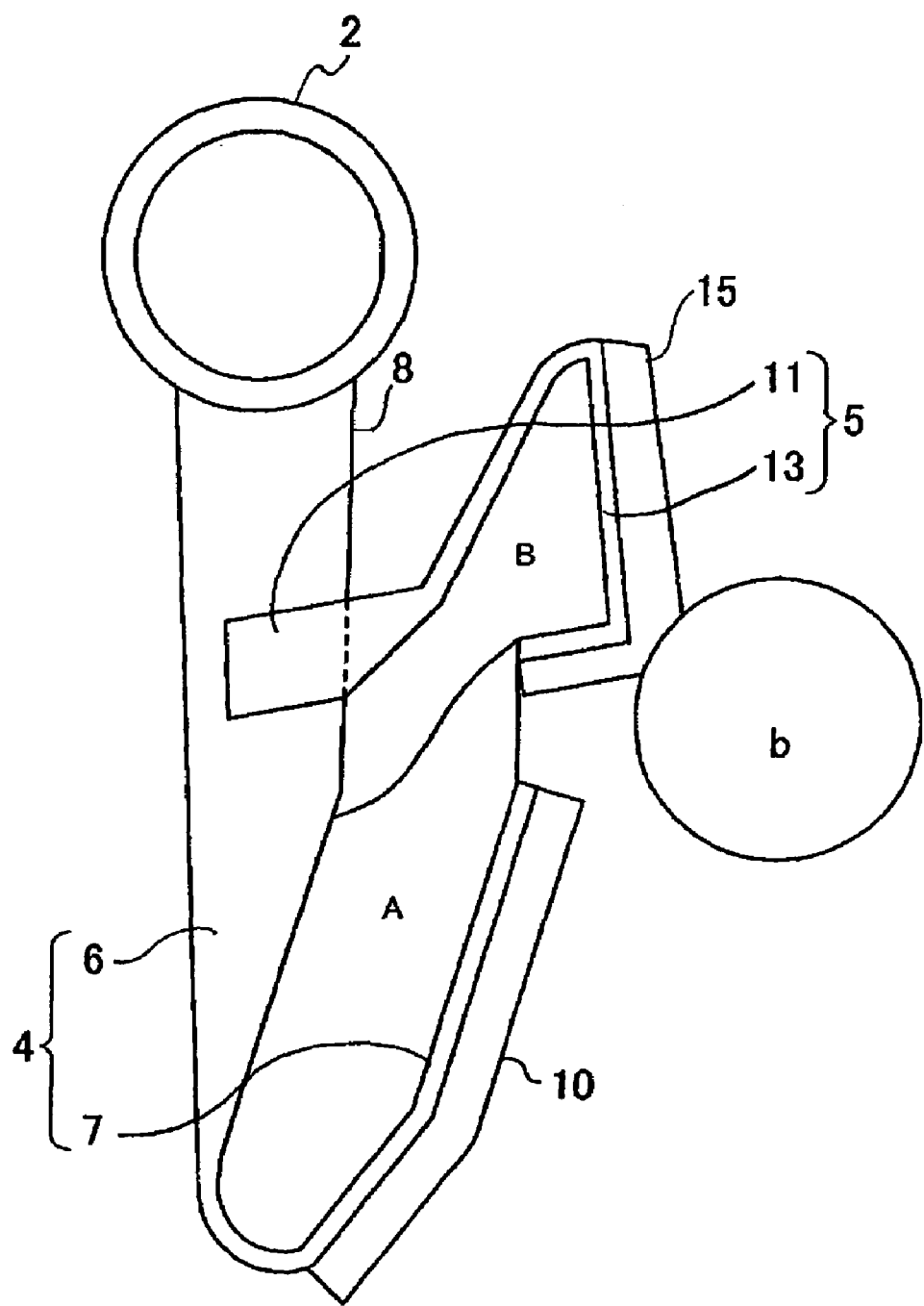
FIG. 10 is a side view illustrating a state in which a knee of large height is hit against the upper bracket.

Next, referring to FIG. 10, the knee "b" of the occupant having the large physical constitution and thus the knee "b" is located at the high position hits against the upper deformation part 13 of the upper bracket 5. Since the high-density foamed body B held in the upper deformation part 13 has the large allowable stress, an amount of absorption of the impact energy of the high-density foamed body B when the upper bracket 5 is deformed is large. Accordingly, it is possible to ensure suppression of the entering of the knee "b" and protection of the knee "b".

In addition, since the upper and lower high-density foamed bodies A and B are attached to each other, the high-density foamed body A on the lower side also deforms when the upper deformation part 13 is deformed, contributing to the impact energy absorption. Moreover, since the cover part 15 is integrally formed on the surface side of the upper deformation part 13, the cover part 15 is also crushed between the upper deformation part 13 and the instrument panel 1 to further absorb the impact energy.

Figure 11:
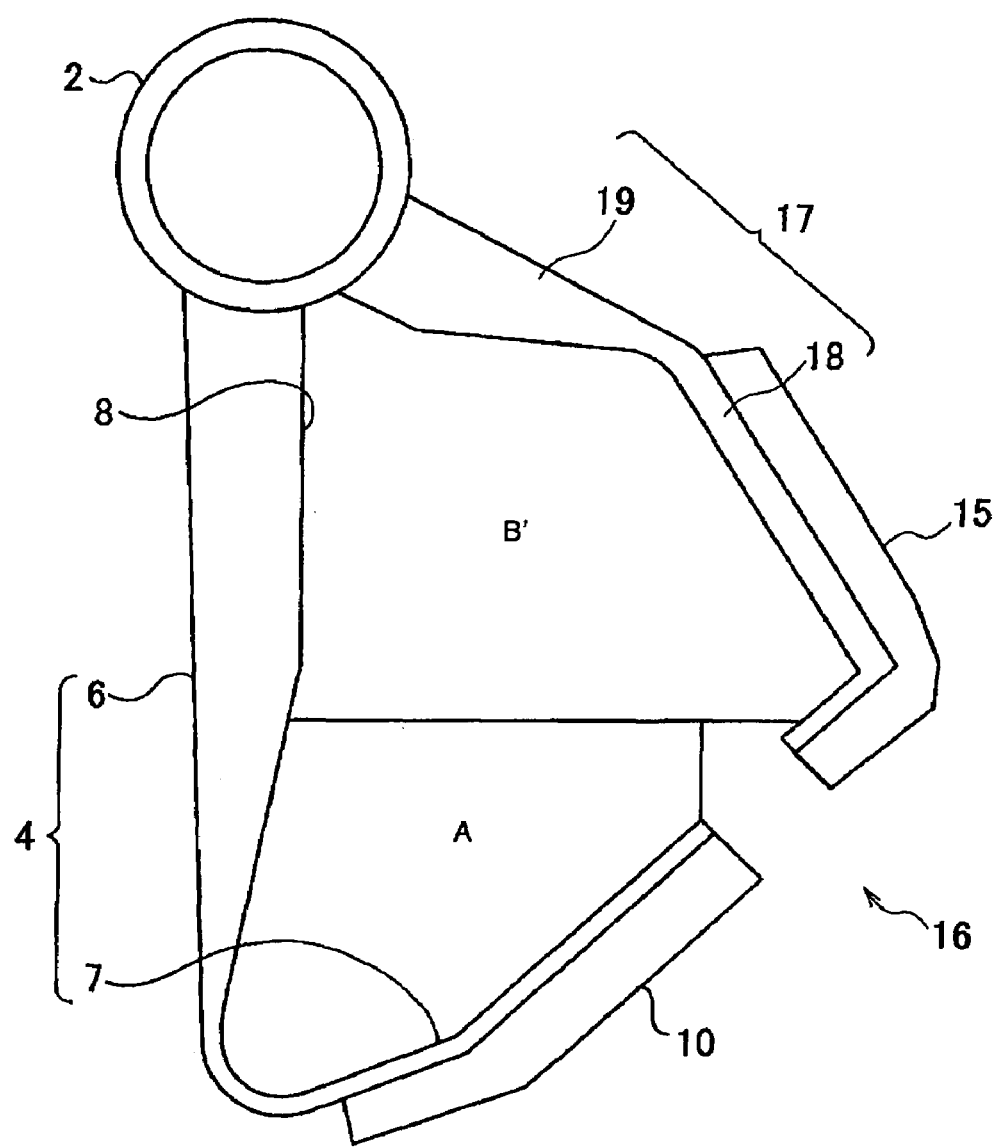
FIG. 11 is a side view illustrating a knee protector according to a second embodiment of the invention.

FIG. 11 illustrates a second embodiment of the present invention. In a knee protector 16 according to the second embodiment, an angle of flexion of an upper deformation part 18 of an upper bracket 17 is increased, and a front end part 19 of the upper bracket 17 is fixed to the steering member 2. Hence, a foamed body or a high-density foamed body B' held in the upper bracket 17 has a larger capacity than that of the high-density foamed body B of the above-described first embodiment, such that the impact energy absorption is further ensured.

Since other elements of the knee protector 16 are same or similar to those described in the first embodiment, they are not described in detail.

According to the above-described embodiments, the urethane is used for the high-density foamed bodies A, B and B'. However, it is to be noted that any other foamed bodies or high-density foamed bodies equivalent to the urethane may be used. Preferably, a material used for the high-density foamed bodies A, B and B' includes urethane, polystyrene, polyethylene, polypropylene, and a combination thereof.

In addition, mutually different kinds of material of foamed bodies may be used for the high-density foamed bodies A and B or B'. Moreover, the high-density foamed bodies A and B or B' may be formed integrally to have a single foamed body. Furthermore, only the high-density foamed body A may be provided between the lower deformation part and the base part, or only the high-density foamed body B or B' may be provided between the upper deformation part and the base part. Such examples may also be considered as preferred embodiments of the invention unless any contradictions occur.

Accordingly, the knee protector for the vehicle according to the embodiments of the invention has at least the following advantageous.

(1) Because the high-density foamed body is crushed to absorb the impact energy, the absorption efficiency of the impact energy is high, and thus the sufficient impact energy absorption is possible even with the short stroke of entering of the knee into the knee protector.

(2) In addition, it is possible to make the longitudinal dimensions of the knee protector small. Hence, it is possible to attain the enlargement of the space in the vehicle interior.

(3) Since the reaction force of the high-density foamed body is substantially constant, it is possible to form the shape of the deformation parts of the knee protector to be flat. Thus, shape design of the knee protector is easy.

(4) The high-density foamed bodies of mutually different types are provided in the lower bracket and the upper brackets each having the different heights, and the allowable stresses or the material properties of the upper and lower high-density foamed bodies are adjusted, respectively. Hence, the most appropriate impact energy absorption corresponding to the knees having different heights due to difference in physical constitution of various occupants is possible.

The present application is based on and claims priority from Japanese Application Number 2005-379849, filed Dec. 28, 2005, the disclosure of which is hereby incorporated by reference herein in its entirety.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present specification or during the prosecution of the application, which examples are to be construed as non-exclusive. For example, in the present disclosure, the term "preferably", "preferred" or the like is non-exclusive and means "preferably", but not limited to. Moreover, no element and component in the present disclosure is intended to be dedicated to the public regardless of whether the element or component is explicitly recited in the following claims.

What is claimed is:

1. A knee protector for a vehicle, comprising:
   a lower bracket including a base part in which an upper end thereof is fixed to a steering member of the vehicle, and a lower deformation part flexed upwardly from a lower end of the base part;
   an upper bracket including a front end part fixed to the base part of the lower bracket, and an upper deformation part flexed downwardly from the front end part and located in a position higher than a position of the lower deformation part;
   a first foamed body provided between the lower deformation part and the base part; and
   a second foamed body provided between the upper deformation part and the base part.

2. The knee protector for the vehicle according to claim 1, wherein the first foamed body has a first material property, and a second foamed body has a second material property different from the first material property of the first foamed body.

3. The knee protector for the vehicle according to claim 1, wherein the first foamed body has a first allowable stress, and the second foamed body has a second allowable stress higher than the first allowable stress of the first foamed body.

4. The knee protector for the vehicle according to claim 1, wherein one of the lower deformation part and the upper deformation part, or both of the lower deformation part and the upper deformation part, has/have a substantially flat shape.

5. The knee protector for the vehicle according to claim 1, wherein the lower deformation part comprises at least one through-hole, and a part of the first formed body is provided integrally on a front surface of the lower deformation part through the at least one through-hole as a cover part.

6. The knee protector for the vehicle according to claim 1, wherein the upper deformation part comprises at least one through-hole, and a part of the second foamed body is provided integrally on a front surface of the upper deformation part through the at least one through-hole as a cover part.

7. The knee protector for the vehicle according to claim 1, wherein the first foamed body and the second foamed body are attached together by an adhesive.

8. The knee protector for the vehicle according to claim 1, wherein a material used for the first foamed body and the second foamed body is selected from a group consisting of urethane, polystyrene, polyethylene, polypropylene, and a combination thereof.

9. A knee protector for a vehicle, comprising:
   a lower bracket including a base part in which an upper end thereof is fixed to a steering member of the vehicle, and a lower deformation part flexed upwardly from a lower end of the base part;
   an upper bracket including a front end part fixed to the steering member, and an upper deformation part flexed downwardly from the front end part and located in a position higher than a position of the lower deformation part;
   a first foamed body provided between the lower deformation part and the base part; and
   a second foamed body provided between the upper deformation part and the base part.

10. The knee protector for the vehicle according to claim 9, wherein the first foamed body has a first material property, and a second foamed body has a second material property different from the first material property of the first foamed body.

11. The knee protector for the vehicle according to claim 9, wherein the first foamed body has a first allowable stress, and the second foamed body has a second allowable stress higher than the first allowable stress of the first foamed body.

12. The knee protector for the vehicle according to claim 9, wherein one of the lower deformation part and the upper deformation part, or both of the lower deformation part and the upper deformation part, has/have a substantially flat shape.

13. The knee protector for the vehicle according to claim 9, wherein the lower deformation part comprises at least one through-hole, and a part of the first foamed body is provided integrally on a front surface of the lower deformation part through the at least one through-hole as a cover part.

14. The knee protector for the vehicle according to claim 9, wherein the upper deformation part comprises at least one through-hole, and a part of the second foamed body is provided integrally on a front surface of the upper deformation part through the at least one through-hole as a cover part.

15. The knee protector for the vehicle according to claim 9, wherein the first foamed body and the second foamed body are attached together by an adhesive.

16. The knee protector for the vehicle according to claim 9, wherein a material used for the first foamed body and the second foamed body is selected from a group consisting of urethane, polystyrene, polyethylene, polypropylene, and a combination thereof.

* * * * *